United States Patent [19]
Watrinet et al.

[11] Patent Number: 6,164,360
[45] Date of Patent: Dec. 26, 2000

[54] LAMINATING MECHANISM FOR PRODUCING A LAMINATED COMPOSITE

[75] Inventors: Hanns Watrinet, Benton, Ky.; Urs Gabi, Schaffhausen, Switzerland

[73] Assignee: Alusuisse Technology & Management AG, Neuhausen am Rheinfall, Switzerland

[21] Appl. No.: 09/194,602

[22] PCT Filed: May 21, 1997

[86] PCT No.: PCT/CH97/00197

§ 371 Date: Nov. 30, 1998

§ 102(e) Date: Nov. 30, 1998

[87] PCT Pub. No.: WO97/45260

PCT Pub. Date: Dec. 4, 1997

[30] Foreign Application Priority Data

May 29, 1996 [EP] European Pat. Off. .............. 96810343

[51] Int. Cl.[7] .................................................. B32B 31/00
[52] U.S. Cl. ........................................... 156/555; 156/324
[58] Field of Search ..................... 156/324, 555, 156/243, 578, 495

[56] References Cited

U.S. PATENT DOCUMENTS

| | | | |
|---|---|---|---|
| 4,248,652 | 2/1981 | Civardi et al. ........................... | 156/219 |
| 4,498,946 | 2/1985 | Schollkopf et al. .................... | 156/324 |
| 5,158,831 | 10/1992 | Schirmer . | |
| 5,192,388 | 3/1993 | Schollkopf et al. .................... | 156/324 |
| 5,429,696 | 7/1995 | Rohleder et al. . | |
| 5,466,403 | 11/1995 | Nissel ..................................... | 264/439 |

FOREIGN PATENT DOCUMENTS

| | | |
|---|---|---|
| 153 220 | 8/1985 | European Pat. Off. . |
| 356 837 | 3/1990 | European Pat. Off. . |
| 453 697 | 10/1991 | European Pat. Off. . |
| 485 896 | 5/1992 | European Pat. Off. . |
| 495 646 | 7/1992 | European Pat. Off. . |
| 59-068214 | 4/1984 | Japan . |

*Primary Examiner*—Jeff H. Aftergut
*Attorney, Agent, or Firm*—Cohen, Pontani, Lieberman & Pavane

[57] ABSTRACT

The invention concerns a method of producing a laminated composite comprising at least one core layer with at least one covering layer, the layers to be interconnected being assembled in the form of strips and being acted upon with the desired laminating pressure between laminating rollers in the roll gap by adjustment of the gap height. The laminated composite emerging from a first roll gap wrap partially around one of the laminating rollers and is then guided through at least one further roll gap. A suitable laminating mechanism comprises three laminating rollers in an approximately L-shaped mutual arrangement. For technical laminates with traction-resistant covering layers, the removal force of the covering layers can generate by reversal a pressure force on the laminating rollers. The duration of the pressure is increased by the action of the subsequent loops wrapping around the rollers.

4 Claims, 1 Drawing Sheet

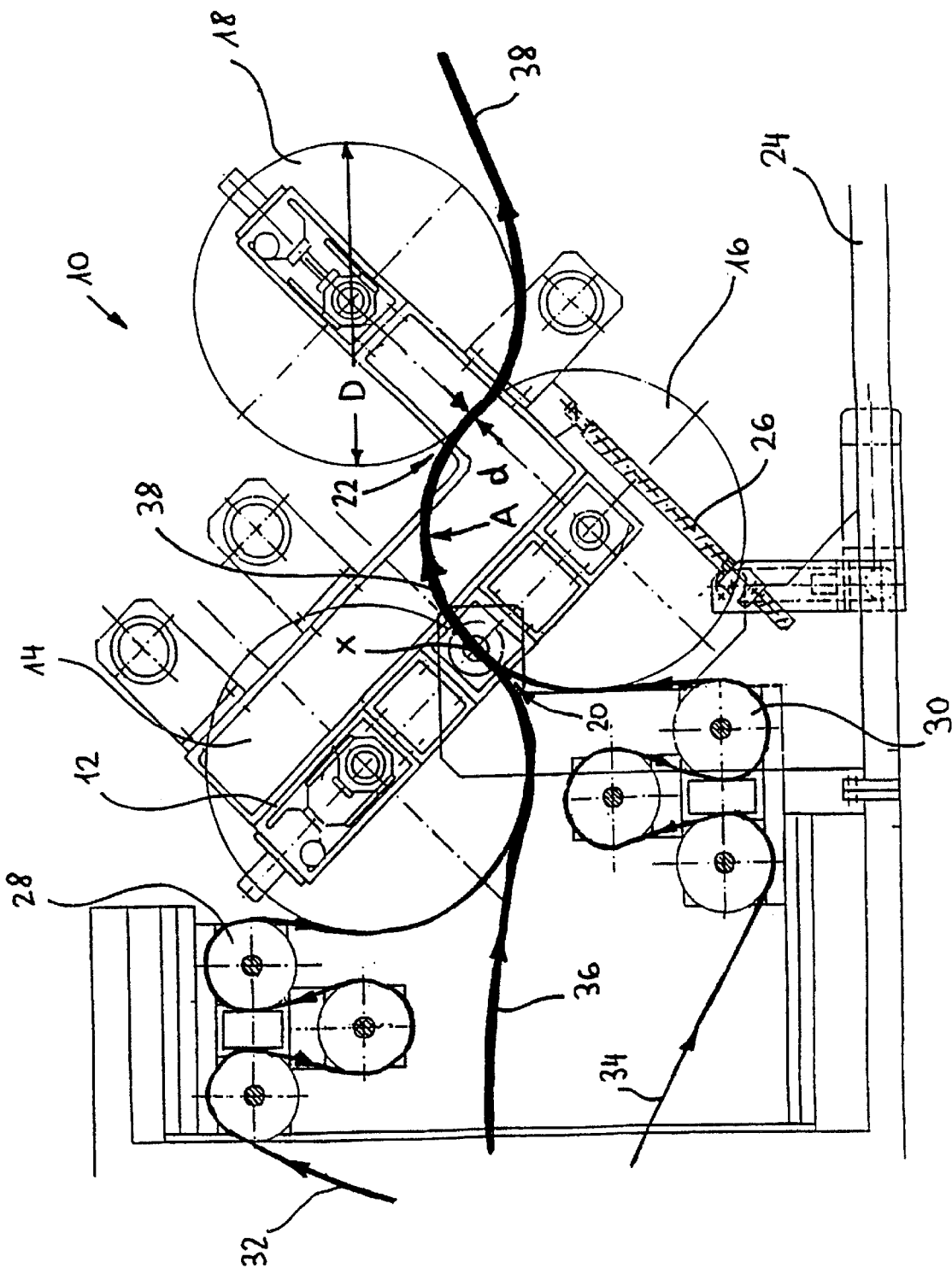

LAMINATING MECHANISM FOR PRODUCING A LAMINATED COMPOSITE

BACKGROUND OF THE INVENTION

1. Field of the Invention

The invention concerns a method of producing a laminated composite comprising at least one core layer with at least one covering layer, the layers to be interconnected being assembled in the form of strips and being acted upon with the desired laminating pressure between laminating rollers in the roll gap by adjustment of the gap height. Also within the scope of the invention is a laminating mechanism suitable for carrying out the method.

2. Discussion of the Prior Art

In the conventional roll laminating of one or more core layers with single or double sided covering layers to produce laminated composites, such as e.g. plastic cores clad with metal sheets, the layers to be joined together are assembled as strips and subjected to the desired laminating pressure in the roll gap between two rollers. As the laminating can take place only in the roll gap and the laminating zone is consequently very short, with conventional two roll laminating facilities only a small amount of heat can be introduced into the composite, which results in a slow rate of manufacture. An increase in production rate can be obtained using a double strip press. The investment requirements for such a press are, however, very much higher than for a roll-laminating facility.

SUMMARY OF THE INVENTION

With the state of the art methods in view it is the object of the present invention to provide a cost favourable method of the kind mentioned at the start, by means of which the rate of production compared with conventional roll-laminating mechanisms can be improved considerably.

A further objective of the invention is the provision of a suitable laminating mechanism for carrying out the method.

The objective with reference to the method is achieved by way of the invention in that the laminated composite emerging from a first roll gap wraps partially round the roll and is passed through at least one further roll gap.

The laminating rollers are preferably driven individually and, usefully, can also be heated individually. In order to increase the force of compression during the wrapping round stage, at least one outer layer can be braked before it enters the first roll gap. This manner of increasing the compressive force is suitable in particular when manufacturing technical grade laminates with high tensile strength outer layers of e.g. aluminium, steel or tear resistant woven materials. On applying a tensile force by pulling the outer layer and deflecting it, a compressive force is applied to the laminating roll. By subsequently wrapping it round part of the roll, the composite laminate is in contact with the roll for a longer length of time, which is necessary for a higher rate of production. Any necessary laminating pressure is produced as the laminate passes through the roll gaps, the height of which is adjusted according to the pressure to be created.

The outer layers and/or the core layers may be heated already before they enter the first roll gap by being partially wrapped round the laminating rollers. This way a partial composite can be formed e.g. an outer layer and a neighbouring core layer, before entering the first roll gap.

The minimum diameter of laminating rollers is chosen such that the outer layers do not exceed their elastic limits in the composite on being deflected or partially wrapped round the rollers, this in order that the curvature of the rolls which is transferred to the product can be removed.

A laminating mechanism suitable for performing the process according to the invention features at least three laminating rollers arranged in series such that one roll forms two roll gaps with two neighbouring rolls.

In a simple, cost favourable laminating mechanism three rollers are arranged approximately in the shape of an L. The laminating rollers, usefully mounted in a frame that allows them to be inclined or tilted, may e.g. be mounted in a frame that can be inclined or tilted via a counter set spindle. Of course, the laminating rollers may also be arranged such that they can be inclined or tilted with respect to each other. By means of the simple possibility of altering the amount of wrapping round the rollers, the compressive forces and the length of time the composite laminate makes contact with the laminating rollers can be set quickly and in an optimal manner.

The laminating mechanism according to the invention comprises in the simplest case three laminating rollers; the number of rollers is, however, not limited.

The process according to the invention is suitable for manufacturing laminate type composites of all kinds. A preferred field of application is in the manufacture of metal/plastic/metal laminates which, as a result of the high tensile strength of their outer layers, enable high compressive forces to be applied to the laminating rollers.

BRIEF DESCRIPTION OF THE DRAWING

Further advantages, features and details of the invention are revealed in the following description of a preferred exemplified embodiment and with the aid of the drawing, which shows schematically in the single FIGURE shown a cross-section through a laminating mechanism.

DETAILED DESCRIPTION OF THE PREFERRED EMBODIMENTS

A laminating mechanism 10 exhibits two L-shaped frame parts 12—between which three laminating rollers 14, 16, 18 are mounted. In a manner corresponding to the L-shape of the frame parts 12, the laminating rollers 14, 16, 18 are also arranged in an L-shape with respect to each other and such that two neighbouring rollers 14, 16 and 16, 18 each form a roll gap 20 and 22 respectively.

The L-shaped frame parts with the laminating rollers 14, 16, 18 are all arranged such that they can be tilted or inclined around an axis x in a machine frame 24. The setting of the angle of tilt is achieved by way of a spindle 26 which on the one hand is fixed to one of the frame parts 12 and on the other hand is mounted on bearings on the machine frame 24.

Each of the two cover layers 32, 34 pass through a set of preheating rollers 28, 30 and are guided from the surface of the laminating rollers 14, 16 to the first roll gap 20. A core layer 36 introduced between the cover layers 32, 34 results in a laminated composite 38 which, after passing through the first roll gap 20, rests against the surface of the second laminating roller 16 and subsequently passes through the second roll gap 22.

In the present case the cover layer 32, after emerging from the set of preheating rollers 28, is brought into contact with the surface of the first laminating roll 14 i.e. the cover layer 32 wraps partially round the laminating roll 14 already before it enters the first roll gap 20. Also the core layer 36 is guided in this manner so that before it enters the first roll gap 20 it rests against the surface of the cover layer 32 making contact with the laminating roll 14. As a result, the ideal conditions for heat transfer are created for the partial laminated composite before entry into the first roll gap 20. In the same manner, before entering the first roll gap, the cover layer 34 is heated further as it emerges from the set of preheating rollers 30, this as a result of it partially wrapping round the laminating roll 16. Consequently, the ideal conditions for heat transfer are also provided for the cover layer 34. After emerging from the first roll gap 20, the individual layers 32, 34, 36 are joined intimately to form a laminated composite 38—as a result of the ideal preheating conditions—already after only a short time of contact as it is subsequently wrapped round the laminating roll 16 in a region of contact A. Consequently, these measures enable a further increase in the rate of production to be achieved. The final compression of the laminated composite 38 takes place in the second roll gap 22.

The cover layers 32, 34 are uncoiled from rollers—not shown here—which are fitted with brakes in order to tighten the strips. The core layer 36 may e.g. be supported directly from an extruder, likewise via braking rollers in order to provide the necessary taughtness. The core layer 36 may also be made up of a plurality of sublayers and may also be provided e.g. on both sides with an adhesive layer or adhesive film.

The laminating rollers 14, 16, 18 may be driven and heated individually. As a result there is the possibility—in conjunction with the braking action on the supply coil—of adjusting the compressive force on the composite 38 in the region of contact A on the middle laminating roll 16 between the two roll gaps 20, 22, and in general in the region it wraps round the laminating rollers 14, 16 18. On the other hand, as a result of the cover layers 32, 34 and the composite 38 wrapping round the laminating rollers 14, 16, 18, the contact surface and therefore the duration of contact with the laminating rollers is significantly increased, enabling better transfer of heat from the rollers to the strips and therefore a higher rate of production to be achieved. As a result of the individually controllable speed of rotation of the laminating rollers 14, 16, 18 stresses introduced into the cover layers 32, 34 due to the curvature of the rollers may be compensated at least in part.

The diameter D of the laminating rollers 14, 16, 18 is e.g. 1000 mm. The minimum diameter is determined by the maximum permissible curvature in the laminated composite 38. The height d of the roll gaps 20, 22 depends on the thickness of the laminated composite 38 to be manufactured and on pressure required in the roll gap.

The laminating mechanism 10 allows laminated composites 38 with a core layer of polypropylene and cover layers of aluminium to be made with an overall thickness of approx. 4 mm, or even thicker.

From the drawing it can be readily seen that the laminating mechanism 10 can be constructed in a simple manner by altering an existing two-roll laminating mechanism.

What is claimed is:

1. A laminating mechanism for producing a laminated composite having a core layer and at least one cover layer, the mechanism comprising:

three laminating rollers arranged in series so that one of the laminating rollers forms two roll gaps with two neighboring laminating rollers; and a machine frame, the three laminating rollers being arranged approximately in a fixed L-shape on a frame pivotably mounted in the machine frame so that the laminating rollers can be one of tilted and inclined simultaneously.

2. A laminating mechanism according to claim 1, wherein the laminating rollers are at least one of individually driven and individually heated.

3. A laminating mechanism according to claim 1, and further comprising a frame pivotably mounted in the machine frame, and a spindle operatively mounted between the frame and the machine frame so as to pivot the frame, the laminating rollers being mounted to the frame.

4. A laminating mechanism according to claim 1, wherein the laminating rollers can be one of tilted and inclined with respect to one another.

* * * * *